DETECTOR FOR INFRA-RED RADIATION
Filed Jan. 27, 1958
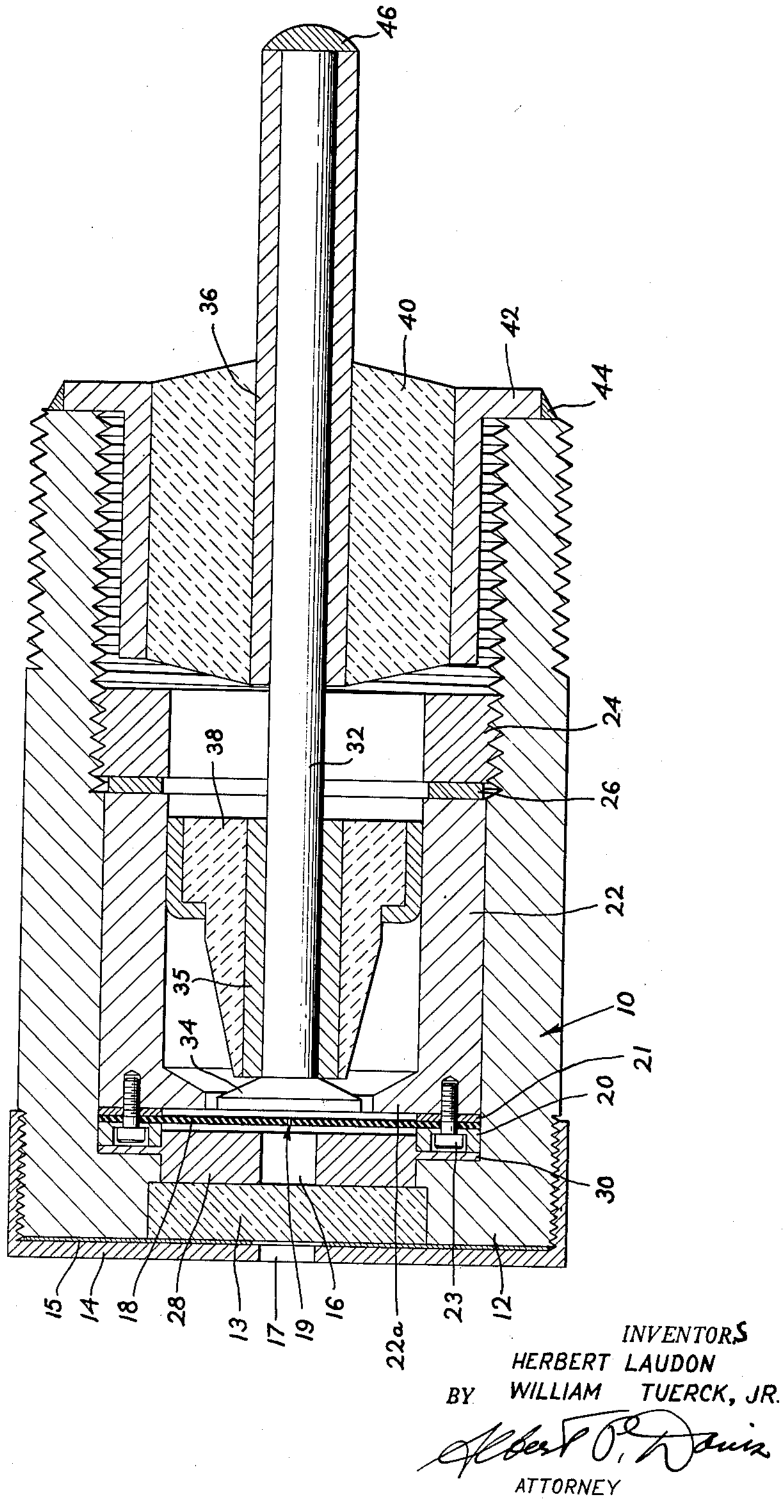
INVENTORS
HERBERT LAUDON
WILLIAM TUERCK, JR.
BY Albert P. Davis
ATTORNEY

United States Patent Office 2,989,638

Patented June 20, 1961

2,989,638

DETECTOR FOR INFRA-RED RADIATION

Herbert Laudon, Forest Hills, and William Tuerck, Jr., Floral Park, N.Y., assignors to Leesona Corporation, a corporation of Massachusetts Filed Jan. 27, 1958, Ser. No. 711,421

6 Claims. (Cl. 250—83.3)

This invention relates to improved infra-red detectors which employ the characteristics of heteroatomic gases to absorb rays of substantially a single wave length.

Infra-red gas detection systems and gas analyzers have been used in the past in connection with gas leak location, identifying noxious gases in the atmosphere or enclosed spaces, process control, etc. For the most part, such applications have employed infra-red detectors which include either an infra-red sensitive bolometric element or a photoconductor, the electrical resistance of which is altered by impinging infra-red energy, or gas absorption detectors.

The bolometric type infra-red detectors are capable of covering a wide range of the infra-red spectrum but are slow to respond to infra-red energy and are insensitive.

The photoconductor type infra-red detectors are more sensitive than the bolometric detectors but cover only a limited range in the infra-red spectrum. Both the bolometric and photoconductor type detectors become increasingly delicate as their sensitivity is increased within their capabilities. Furthermore, the sensitivity of photoconductor type detectors varies with ambient visible light and temperature conditions and deteriorate rapidly at high temperatures.

The prior art gas absorption detectors produced in the past are slow to respond to infra-red energy, are relatively insensitive and are delicate. However, gas absorption detectors can be made to cover selected bands over a very wide wave length. Because of this last mentioned characteristic of gas absorption detectors they are well suited for use in the above mentioned systems. However, because of the above mentioned disadvantages of this type detector it has been necessary to use them in connection with low frequency amplifiers which are inefficient because of their low signal to noise ratio, the systems and analyzers employing them have been bulky and difficult to transport and use in the field and have been limited in the applications to which they can be used. It has been known that if gas absorption type detectors could be miniaturized they would have greatly improved sensitivity and speed of response over the large prior art detectors of this type previously known and used. However, it has not been possible heretofore to make such a miniaturized detector on anything but a laboratory scale.

Consequently, one of the objects of this invention is to provide a small infra-red detector having improved sensitivity.

Another object of the present invention is to provide an infra-red gas absorption type of detector which minimises the disadvantage mentioned above in that it is capable of responding rapidly to infra-red energy to produce an appreciable electrical output signal, is small in size, rugged, and responsive to infra-red radiation over a narrow or wide band as desired.

Another object of this invention is to provide an infra-red detector which is rugged, readily portable, and which at the same time has high sensitivity and is relatively unaffected by ambient infra-red or visible radiation of undesired wave lengths.

A further object of this invention is to provide a gas absorption infra-red detector which is small in size and is highly sensitive and selective in its response, yet capable of producing an electrical output which may be readily amplified to operate signalling and metering devices.

Yet another object of the present invention is to provide a gas absorption infra-red detector which reacts swiftly to infra-red energy.

Other objects and advantages of the invention will be apparent from the following detailed description of the exemplary forms thereof which are illustrated in the accompanying drawing which is a vertical cross-sectional view of a gas absorption type of infra-red detector cell incorporating the present invention.

To operate effectively with amplifiers having a high signal to noise ratio a gas absorption detector should have the ability to detect infra-red energy at least as low as .01 microwatt impinging thereon and to respond to such energy with a frequency at least as fast as 100 cycles per second. Detectors made in accordance with the present invention are capable of meeting these requirements and in many instances exceeding them.

Infra-red detectors according to the present invention include an annular housing 10 which is formed of metal and may be of a glass sealing alloy such as Kovar, which consists essentially of 20% nickel, 17% cobalt, .2% manganese, and the balance iron. However, any suitable conductive material may be used, this being necessary since the housing serves as one of the output terminals for the detector. The forward end of the housing 10 is provided with an inwardly directed annular flange 12, the inner edge of which defines a circular opening in which a window 13 is positioned. This window is formed of suitable infra-red transmitting material as, for example, glass, quartz, silver chloride, germanium, sapphire or other material which will pass the desired infra-red radiation. The window forms the forward wall of a cavity 16 which is located on the axis of the detector and is held in place and sealed therein by cap 14 and gasket 15. An opening 17 is provided in the center of cap 14 in alignment with, and substantially the same diameter as, cavity 16. The cavity is cylindrical and its rear wall consists of a flexible diaphragm 18 having a minute hole 19 therethrough and which is held in position within the detector by the sleeve 22. Diaphragm 18 is mounted on and spaced a predetermined distance from sleeve 22 and its inwardly extending flange **22*a* by being clamped between clamping ring 20 and spacing ring 21 by screws 23 which pass through said two rings and threadedly engage holes in the end of said sleeve. Sleeve 22 is held in position in the detector by the externally threaded ring 24 which works along the threads formed on the rearward inner surface of the housing 10. The ring 24 and the sleeve 22 may be separated by a resilient ring member such as 26 in order to provide a controllable pressure on sleeve 22**. The above described assembly is small in the interest of conserving space, the outside diameter preferably not exceeding .75 inch. As will become more apparent hereinafter the dimensions of the cavity are extremely small, in some instances having a diameter of only .025 inch.

The reduced cavity size is achieved in the detector shown in the drawing with an effective reduction of the window and diaphragm size, by means of the annular plug 28 which is positioned between window 14 and diaphragm 18. The central aperture of the plug lies on the longitudinal axis of the detector, and defines the effective volume of the detector gas cavity. Optimum results are achieved when the plug fits precisely against the outer walls of the cavity and the inner surface of the window. The rear surface of plug 28 is spaced slightly from diaphragm 18, preferably .00025 inch, and this space, together with the space between said diaphragm and inwardly extending flange **22*a* of sleeve 22 and stator 34, to be explained in detail hereinafter, provide a viscous damping for said diaphragm. As shown in the drawing, the outer wall of the plug 28 is provided with a radial flange 30 which is pressed between the inner wall of the housing flange 12 and the clamping ring 20 to maintain the plug in position within the detector. It will be understood that plug 28 can be formed integral with flange 12** if it is desired.

Diaphragm 18 may be formed from any suitable material capable of deflecting when subjected to pressure. For example, it may consist of sheet plastic material such as polyethylene terephthalate, sold by the E. I. du Pont Company under the name "Mylar," thin sheet quartz, or thin sheet metal such as aluminum, steel or brass. If the diaphragm 18 is formed from non-conducting material, such as plastic, the forward surface thereof is coated with conductive material such as gold, silver or aluminum which at the same time is reflective of infra-red radiations. If the diaphragm is formed from steel or brass said forward surface is provided with an infra-red reflective coating, preferably gold or silver. Diaphragm 18 preferably is prestressed. That is, it is stretched when it is clamped between ring 20 and sleeve 22 so as to be under tension to thus increase its effective stiffness without increasing its mass. Inasmuch as the coating applied to the surface of said diaphragm facing window 14 is highly reflective of infra-red radiations such non-characteristic radiations as are not absorbed by the gas in cavity 16 are reflected back and out therethrough to prevent their absorption by the apparatus. It will also be understood that the side walls of cavity 16 are also reflective of infra-red radiation and that, together with the reflectivity of said diaphragm, prevent appreciable absorption of such radiation by the detector.

It will be understood that as gas in cavity 16 absorbs and is heated by infra-red radiations the pressure exerted by said gas on said diaphragm is increased to thereby deflect said diaphragm. It is highly desirable that the stiffness of the diaphragm be matched to the acoustic stiffness of cavity 16. To attain such a match in a diaphragm having a diameter substantially equal to the small diameter of the cavity employed in the present invention such diaphragm would have to be extremely thin, in the order of .00002 to .00003 inch. Obviously the problems connected with making, handling, mounting and positioning such a diaphragm in a detector are so great that commercial production and use thereof is precluded. In the present invention an acoustical match is obtained by making the diaphragm larger in diameter than the cavity and of thicker material so that it has the same effective stiffness as the smaller thinner diaphragm. The thicker material is obtainable commercially, can be handled with relative ease and can be accurately positioned in a detector, all of which make practicable the commercial production of small, highly sensitive infra-red detectors capable of rapid response to infra-red energy.

The diaphragm 18 forms one element of a capacitor, the other element being the stator 32 which is mounted on the longitudinal axis of the detector and is provided with the enlarged head 34 which has its flat face lying parallel to the diaphragm and in the same plane as the face of flange 22*a*. Head 34 is spaced slightly from diaphragm 18, said spacing preferably being in the order of .00025 inch. The stator is electrically insulated from the diaphragm and housing and is supported by its stem in the metal tubes 35, 36 which protrude through the glass insulators 38, 40, respectively. The insulators are provided with metal casings, and the encased insulator 38 fits snugly within and is fixed to the sleeve 22. The insulator 40 is fixed to the housing by means of a flange 42 on the rearward end of its metal casing which is hermetically sealed, as at 44, to the rearward edge of the housing 10. The metal tube 36, into which the stator stem fits, extends rearwardly from the insulator 40 to provide a terminal plug for one element of the described capacitor. The end of this terminal is also hermetically sealed, as at 46.

Prior to sealing, the detector is charged with the gas or gases which absorb the infra-red radiation to which it is desired to have the detector respond. This gas fills the interior of the detector on both sides of the diaphragm, and the pin hole 19 through the diaphragm permits the pressure to equalize on both sides thereof. In this connection it should be noted that the detector is charged with pure gas or gases. That is to say, the gas or gases in the detector which absorb infra-red radiation is not diluted or mixed with air, or other gases incapable of absorbing such energy, as is necessary in the prior art large detectors.

The detector described above is thus a gas absorption type in which the gas-filled cavity 16 serves as a selective infra-red receiving element. The detector absorbs only infra-red radiation of the wave lengths which are characteristic of the cavity gas. Absorption of this energy causes temperature and pressure changes within the cavity which in turn cause deflection of the diaphragm 18. The pressure within the cavity caused by the absorbed radiation develops almost instantaneously so that the diaphragm is deflected before the pressure is able to equalize on both sides of the diaphragm through the pin hole 19, or to enter the space between said diaphragm and plug 28.

As previously stated diaphragm 18 and stator 34 constitute a capacitor. When the detector of the present invention is used it is connected in a suitable circuit and has an electrical charge, for example $3\times10^{-10}$ coulomb, established on said diaphragm. Pressure variations in cavity 16 deflect the diaphragm to move it closer to stator 34 thus changing the capacity of the capacitor and resulting in electrical potential variations suitable for amplification by said circuit. Important related features of the present invention are that the effective area of the gas cavity is small, ranging from a diameter of .025 inch to about .50 inch, that the diaphragm is stiff, and that the depth of the gas cavity is tuned to the acoustical stiffness of the diaphragm. The diameter of the effective area of the gas cavity corresponds to the internal diameter of the cavity plug 28, as explained above. A stiff diaphragm is understood to be one which need not be capable of easy distension for sensitivity, as are the diaphragms used, for example, in pneumatic detectors.

The features of the illustrated detector described immediately above permit maximum energy transfer from the gas cavity to the electrical output and permit the construction of a robust, miniaturized, sensitive, selective gas-absorption type detector. Such detector, due to the small size of the gas cavity, has the added advantages of improved performance under shock and vibration conditions, and fast response, due to the low inertia of the very small volume of detector gas.

Infra-red detectors were made in accordance with the present invention and having the following dimensions and characteristics:

*Example I*

| | |
|---|---|
| Outside diameter | .375 inch |
| Overall length | .675 inch |
| Cavity diameter | .025 inch |
| Cavity depth | .050 inch |
| Diaphragm diameter | .190 inch |
| Gas | $CO_2$ |
| Gas pressure | 150 cm. mercury absolute |
| Diaphragm material | "Mylar" |
| Diaphragm stress | 2000 p.s.i. |
| Diaphragm thickness | .00025 inch |
| Spacing diaphragm to stator | .00025 inch |
| Spacing diaphragm to plug | .00025 inch |
| Surface plating on diaphragm | Aluminum |

When this detector was connected to a suitable amplifier it was found that it would respond to an infra-red energy input as low as .003 microwatt and that it responded to this energy in .0016 second.

*Example II*

Similar to Example I except that the cavity diameter was .037 inch and the gas pressure was 125 cm. of mercury absolute. This detector when connected to a suitable amplifier was found to be capable of responding to an infra-red energy input as low as .0008 microwatt and to respond to this energy in .003 second.

*Example III*

Similar to Example II except that the outside diameter was .437 inch, the cavity diameter was .05 inch and the gas pressure was 100 cm. of mercury absolute. When connected to a suitable amplifier it was found that this detector was capable of responding to an infra-red energy input as low as .0007 microwatt and of responding to this energy in .003 second.

*Example IV*

Similar to Example III except that the cavity diameter was .075 inch. When connected to a suitable amplifier it was found that this detector was capable of responding to an infra-red energy input as low as .001 microwatt and of responding to this energy in .0033 second.

*Example V*

Similar to Example III except that the cavity diameter was .125 inch. This detector when connected to a suitable amplifier was found to be capable of responding to an infra-red energy input as low as .0013 microwatt and to respond to this energy in .004 second.

Since certain changes may be made in the above apparatus without departing from the scope of the invention herein involved, it is intended that all matter contained in the above description or shown in the accompanying drawing shall be interpreted as illustrative and not in a limiting sense.

What is claimed is:

1. A heteroatomic infra-red detector having a cavity defined by side walls and a window at one end thereof capable of transmitting infra-red radiation, a diaphragm having a diameter at least 25% greater than the diameter of said cavity closely adjacent but spaced slightly from the other end of said cavity and the end of said cavity side walls, and a gas in said cavity capable of absorbing infra-red radiation, the space between said diaphragm and the end of said cavity side walls being so restricted that pressure changes in said cavity due to absorption of infra-red energy are prevented from acting on the entire surface of said diaphragm.

2. A heteroatomic infra-red detector having a cavity defined by side walls and a window at one end thereof capable of transmitting infra-red radiation, a gas in said cavity capable of absorbing infra-red radiation, and a diaphragm having a diameter greater than said cavity spaced in the order of .00025 inch from the other end of said cavity and the end of said cavity side walls whereby pressure changes in said cavity due to absorption of infra-red energy are prevented from acting on the entire surface of the diaphragm.

3. A heteroatomic infra-red detector having a cavity defined by side walls and a window at one end thereof capable of transmitting infra-red radiation, a gas in said cavity capable of absorbing infra-red radiation, and a diaphragm having a diameter at least 25% greater than the diameter of said cavity spaced in the order of .00025 inch from the other end of said cavity and the end of said cavity side walls, whereby pressure changes in said cavity due to absorption of infra-red energy are prevented from acting on the entire surface of said diaphragm.

4. A heteroatomic infra-red detector having a cavity defined by side walls and a window at one end thereof capable of transmitting infra-red radiation, a gas in said cavity capable of absorbing infra-red radiation, and a diaphragm closely adjacent but spaced slightly from the other end of said cavity, said diaphragm having a diameter at least 25% greater than the diameter of said cavity and having a coating on one surface thereof capable of reflecting infra-red radiation.

5. A heteroatomic infra-red detector having a cavity defined by side walls and a window at one end thereof capable of transmitting infra-red radiation, a gas in said cavity capable of absorbing infra-red radiation, and a diaphragm spaced in the order of .00025 inch from the other end of said cavity, said diaphragm having a diameter greater than the diameter of said cavity and having an electrically conductive coating on one surface thereof capable of reflecting infra-red radiation and forming one element of a capacitor.

6. A heteroatomic infra-red detector having a cavity defined by side walls and a window at one end thereof capable of transmitting infra-red radiation, a gas in said cavity capable of absorbing infra-red radiation, and a diaphragm spaced in the order of .00025 inch from the other end of said cavity, said diaphragm having a diameter at least 25% greater than the diameter of said cavity and having an electrically conductive coating on one surface thereof capable of reflecting infra-red radiation and forming one element of a capacitor.

References Cited in the file of this patent

UNITED STATES PATENTS

| | | |
|---|---|---|
| 2,573,870 | Pfund | Nov. 6, 1951 |
| 2,681,415 | Liston | June 15, 1954 |
| 2,688,090 | Woodhull | Aug. 31, 1954 |
| 2,767,321 | Woodhull | Oct. 16, 1956 |
| 2,867,792 | Peters | Jan. 6, 1959 |
| 2,897,485 | Johnson | July 28, 1959 |

FOREIGN PATENTS

| | | |
|---|---|---|
| 657,564 | Great Britain | Sept. 19, 1951 |

OTHER REFERENCES

Hayes: "A New Receiver of Radiant Energy," in Review of Scientific Instruments, vol. 1, May 1936.

Zahl et al.: "Pneumatic Heat Detector," in Review of Scientific Instruments, vol. 17, No. 11, November 1946.

Golay: Abstract No. 24,636, 644 Official Gazette 1230, Mar. 27, 1951.

Smith et al.: Detection and Measurement of Infra-Red Radiation, published by Oxford at the Clarendon Press, 1957, pages 116 to 118.